United States Patent
Chen et al.

(10) Patent No.: US 6,713,800 B2
(45) Date of Patent: Mar. 30, 2004

(54) MAGNETORESISTIVE SENSOR WITH REDUCED SIDE-READING EFFECT

(75) Inventors: Erli Chen, Belle Mead, NJ (US); Sining Mao, Savage, MN (US); Zheng Gao, Bloomington, MN (US); Paul Kolbo, Bloomington, MN (US); Douglas Saunders, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/185,260

(22) Filed: Jun. 27, 2002

(65) Prior Publication Data

US 2004/0000682 A1 Jan. 1, 2004

(51) Int. Cl.$^7$ ............................................. H01L 31/119
(52) U.S. Cl. ........................ 257/295; 257/295; 257/294
(58) Field of Search ................................ 257/295, 421; 360/110, 319, 324.1, 324.11, 324.12; 365/158

(56) References Cited

U.S. PATENT DOCUMENTS

| | | | | |
|---|---|---|---|---|
| 4,103,315 A | * | 7/1978 | Hempstead et al. | 360/110 |
| 5,208,715 A | * | 5/1993 | Mowry | 360/319 |
| 5,668,688 A | * | 9/1997 | Dykes et al. | 360/324.1 |
| 6,185,077 B1 | * | 2/2001 | Tong et al. | 360/324.11 |
| 6,185,078 B1 | * | 2/2001 | Lin et al. | 360/324.12 |
| 6,396,734 B2 | * | 5/2002 | Ishikawa et al. | 365/158 |
| 2003/0076635 A1 | * | 4/2003 | Morigana et al. | 360/324.12 |

* cited by examiner

Primary Examiner—David Nelms
Assistant Examiner—Thinh T Nguyen
(74) Attorney, Agent, or Firm—Kinney & Lange P.A.

(57) ABSTRACT

A read sensor for use in a magnetic read head includes a magnetoresistive stack having a plurality of layers, and first and second shield regions positioned adjacent to the magnetoresistive stack. Each of the shield regions includes a first soft magnetic layer for shunting flux from an adjacent track to the shield region instead of the magnetoresistive stack.

25 Claims, 3 Drawing Sheets

MAGNETORESISTIVE SENSOR WITH REDUCED SIDE-READING EFFECT

BACKGROUND OF THE INVENTION

The present invention relates generally to a magnetoresistive sensor for use in a magnetic read head. In particular, the present invention relates to a magnetoresistive read sensor having reduced side-reading.

Magnetoresistive read sensors, such as giant magnetoresistive (GMR) read sensors, are used in magnetic data storage systems to detect magnetically-encoded information stored on a magnetic data storage medium such as a magnetic disc. A time-dependent magnetic field from a magnetic medium directly modulates the resistivity of the GMR read sensor. A change in resistance of the GMR read sensor can be detected by passing a sense current through the GMR read sensor and measuring the voltage across the GMR read sensor. The resulting signal can be used to recover the encoded information from the magnetic medium.

A typical GMR read sensor configuration is the GMR spin valve, in which the GMR read sensor is a multi-layered structure formed of a nonmagnetic spacer layer positioned between a ferromagnetic pinned layer and a ferromagnetic free layer. The magnetization of the pinned layer is fixed in a predetermined direction, typically normal to an air bearing surface of the GMR read sensor, while the magnetization of the free layer rotates freely in response to an external magnetic field. The resistance of the GMR read sensor varies as a function of an angle formed between the magnetization direction of the free layer and the magnetization direction of the pinned layer. This multi-layered spin valve configuration allows for a more pronounced magnetoresistive effect, i.e. greater sensitivity and higher total change in resistance, than is possible with anisotropic magnetoresistive (AMR) read sensors, which generally consist of a single ferromagnetic layer.

GMR spin valves are configured to operate in either a current-in-plane (CIP) mode or a current-perpendicular-to-plane (CPP) mode. In CIP mode, the sense current is passed through in a direction parallel to the layers of the read sensor. In CPP mode, the sense current is passed through in a direction perpendicular to the layers of the read sensor.

A tunneling magnetoresistive (TMR) read sensor is similar in structure to a GMR spin valve configured in CPP mode, but the physics of the device are different. For a TMR read sensor, rather than using a spacer layer, a barrier layer is positioned between the free layer and the pinned layer. Electrons must tunnel through the barrier layer. A sense current flowing perpendicularly to the plane of the layers of the TMR read sensor experiences a resistance which is proportional to the cosine of an angle formed between the magnetization direction of the free layer and the magnetization direction of the pinned layer.

One principal concern in the performance of magnetoresistive read sensors is the side-reading effect of the sensor. Current read sensors not only sense magnetic flux from a track located directly beneath the read sensor on the magnetic medium, but they also typically sense magnetic flux from adjacent tracks located up to 3 $\mu$-inches outside the edge of the read sensor. This is known as the side-reading effect and results in an effective increase of up to 6 $\mu$-inches in reader width. This magnetic flux leakage from adjacent tracks limits the read sensor's ability to accurately sense magnetic flux from the track located directly beneath it. In addition, the effective increase in reader width of the read sensor limits the density of tracks (and thus data) on a magnetic medium.

The present invention addresses these and other needs, and offers other advantages over current devices.

BRIEF SUMMARY OF THE INVENTION

The present invention is a read sensor for use in a magnetic read head. The read sensor includes a magnetoresistive stack having a plurality of layers, and first and second shield regions positioned adjacent to the magnetoresistive stack. Each of the shield regions includes a first soft magnetic layer for shunting flux from an adjacent track to the shield region instead of the magnetoresistive stack.

DETAILED DESCRIPTION

Figure 1:
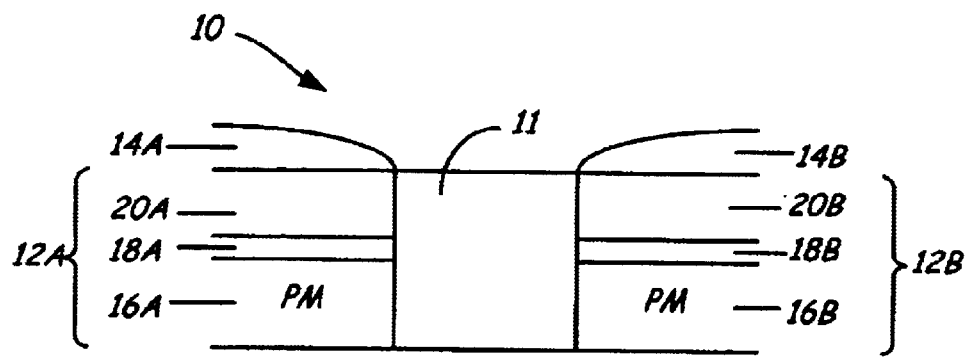
FIG. 1 is a layer diagram of a first embodiment of a read sensor of the present invention.

FIG. 1 is a layer diagram of a first embodiment of a read sensor 10 of the present invention. Read sensor 10 includes a magnetoresistive stack 11, shield regions 12A and 12B, and contacts 14A and 14B. Magnetoresistive stack 11 is a giant magnetoresistive (GMR) stack configured to operate in a current-in-plane (CIP) mode wherein a sense current flows substantially parallel to the layers of the stack Shield region 12A is positioned adjacent to a side surface of GMR stack 11, and includes a permanent magnet layer 16A, a seed layer 18A, and a ferromagnetic layer 20A. Seed layer 18A is positioned between permanent magnet layer 16A and ferromagnetic layer 20A. Shield region 12B is positioned adjacent to a side surface of GMR stack 11 opposite to shield region 12A, and includes a permanent magnet layer 16B, a seed layer 18B, and a ferromagnetic layer 20B. Seed layer 18B is positioned between permanent magnet layer 16B and ferromagnetic layer 20B. Contact 14A is positioned adjacent to ferromagnetic layer 20A, and contact 14B is positioned adjacent to ferromagnetic layer 20B.

Contacts 14A and 14B provide a sense current through GMR stack 11. The GMR signal produced by GMR stack 11 is generated by the sense current flowing parallel to the layers of GMR stack 11. Permanent magnet layers 16A and 16B are preferably selected from the group consisting of CoPt, CoCrPt and SmCo, and preferably have a thickness in the range of about 100 Å to about 300 Å. Seed layers 18A and 18B are preferably selected from the group consisting of Ti, Rh, Ta, Cu, Au and Ru, and preferably have a thickness in the range of about 30 Å to about 50 Å. Ferromagnetic layers 20A and 20B are preferably selected from the group consisting of NiFe, CoFe, CoZrNb, CoZrTi and NiFeX, where X is selected from the group consisting of Co, Cr, Rh, Re, Nb, Ta, Ti, V, Hf, W and Ru, and preferably have a thickness in the range of about 15 Å to about 60 Å. Ferromagnetic layers 20A and 20B shunt flux from an adjacent track to shield regions 12A and 12B, respectively, instead of GMR stack 11. This reduces the side-reading effect of read sensor 10, and causes an effective decrease in reader width of read sensor 10. Seed layers 18A and 18B decouple the exchange between permanent magnet layers 16A and 16B and ferromagnetic layers 20A and 20B, respectively. Contacts 14A and 14B overlap ferromagnetic layers 20A and 20B, respectively, and effectively eliminate a magnetoresistive effect from ferromagnetic layers 20A and 20B.

Figure 1A:
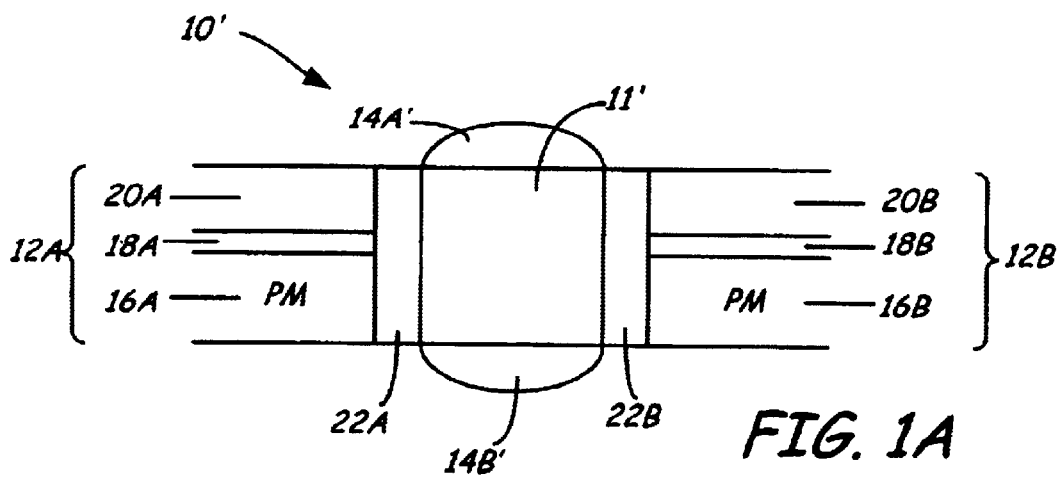
FIG. 1A is a layer diagram of a second embodiment of a read sensor of the present invention.

FIG. 1A is a layer diagram of a second embodiment of a read sensor 10' of the present invention. Read sensor 10' is similar to read sensor 10 of FIG. 1. Magnetoresistive stack 11', however, differs from magnetoresistive stack 11 of FIG. 1 in that magnetoresistive stack 11' is either a GMR stack or a tunneling magnetoresistive (TMR) stack configured to operate in a current-perpendicular-to-plane (CPP) mode wherein a sense current flows substantially perpendicular to the layers of the stack. Contact 14A' is positioned adjacent to a top surface of magnetoresistive stack 11', and contact 14B' is positioned adjacent to a bottom surface of magnetoresistive stack 11' opposite to contact 14A'. In addition, an oxide insulation layer 22A is positioned between magnetoresistive stack 11' and shield region 12A, and an oxide insulation layer 22B is positioned between magnetoresistive stack 11' and shield region 12B.

Figure 2:
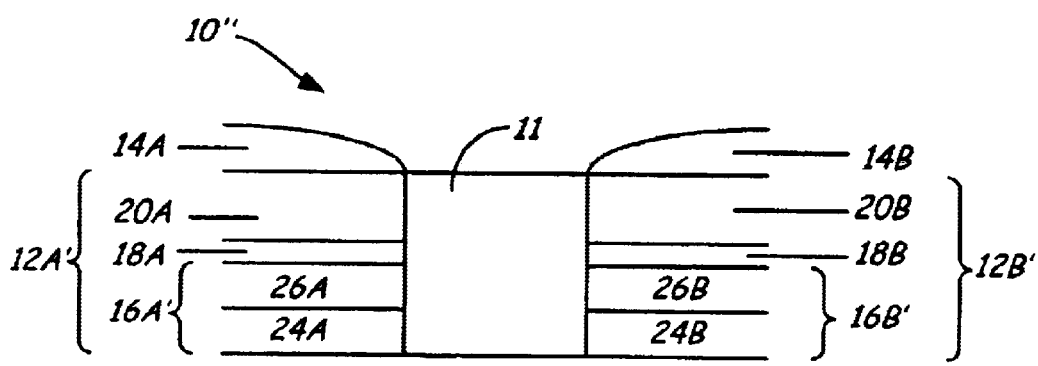
FIG. 2 is a layer diagram of a third embodiment of a read sensor of the present invention.

FIG. 2 is a layer diagram of a third embodiment of a read sensor 10" of the present invention. Read sensor 10" is similar to read sensor 10 of FIG. 1. Shield regions 12A' and 12B', however, differ from shield regions 12A and 12B of FIG. 1 in that permanent magnet layer 16A' includes an antiferromagnetic layer 24A and a ferromagnetic layer 26A, and permanent magnet layer 16B' includes an antiferromagnetic layer 24B and a ferromagnetic layer 26B. Antiferromagnetic layer 24A is exchange coupled to ferromagnetic layer 26A to fix the magnetization of ferromagnetic layer 26A, and together function as a permanent magnet layer. Similarly, antiferromagnetic layer 24B is exchange coupled to ferromagnetic layer 26B to fix the magnetization of ferromagnetic layer 26B, and together function as a permanent magnet layer.

Figure 3:
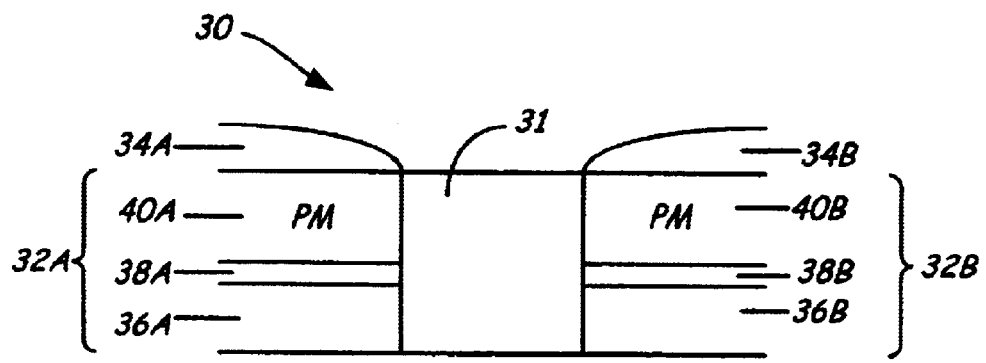
FIG. 3 is a layer diagram of a fourth embodiment of a read sensor of the present invention.

FIG. 3 is a layer diagram of a fourth embodiment of a read sensor 30 of the present invention. Read sensor 30 includes a magnetoresistive stack 31, shield regions 32A and 32B, and contacts 34A and 34B. Magnetoresistive stack 31 is a giant magnetoresistive (GMR) stack configured to operate in a current-in-plane (CIP) mode wherein a sense current flows substantially parallel to the layers of the stack. Shield region 32A is positioned adjacent to a side surface of GMR stack 31, and includes a ferromagnetic layer 36A, a seed layer 38A, and a permanent magnet layer 40A. Seed layer 38A is positioned between ferromagnetic layer 36A and permanent magnet layer 40A. Shield region 32B is positioned adjacent to a side surface of GMR stack 31 opposite to shield region 32A, and includes a ferromagnetic layer 36B, a seed layer 38B, and a permanent magnet layer 40B. Seed layer 38B is positioned between ferromagnetic layer 36B and permanent magnet layer 40B. Contact 34A is positioned adjacent to permanent magnet layer 40A, and contact 34B is positioned adjacent to permanent magnet layer 40B.

Contacts 34A and 34B provide a sense current through GMR stack 31. The GMR signal produced by GMR stack 31 is generated by the sense current flowing parallel to the layers of GMR stack 31. Ferromagnetic layers 36A and 36B are preferably selected from the group consisting of NiFe, CoFe, CoZrNb, CoZrTi and NiFeX, where X is selected from the group consisting of Co, Cr, Rh, Re, Nb, Ta, Ti, V, Hf, W and Ru, and preferably have a thickness in the range of about 15 Å to about 60 Å. Seed layers 38A and 38B are preferably selected from the group consisting of Ti, Rh, Ta, Cu, Au and Ru, and preferably have a thickness in the range of about 30 Å to about 50 Å. Permanent magnet layers 40A and 40B are preferably selected from the group consisting of CoPt, CoCrPt and SmCo, and preferably have a thickness in the range of about 100 Å to about 300 Å. Ferromagnetic layers 36A and 36B shunt flux from an adjacent track to shield regions 32A and 32B, respectively, instead of GMR stack 31. This reduces the side-reading effect of read sensor 30, and causes an effective decrease in reader width of read sensor 30. Seed layers 38A and 38B decouple the exchange between ferromagnetic layers 36A and 36B and permanent magnet layers 40A and 40B, respectively.

In view of FIG. 1A, read sensor 30 would also function similarly if magnetoresistive stack 31 were either a GMR stack or a tunneling magnetoresistive (TMR) stack configured to operate in a current-perpendicular-to-plane (CPP) mode wherein a sense current flows substantially perpendicular to the layers of the stack In both instances, contact 34A would be positioned adjacent to a top surface of magnetoresistive stack 31, and contact 34B would be positioned adjacent to a bottom surface of magnetoresistive stack 31 opposite to contact 34A. In addition, a layer of oxide insulation would be positioned between magnetoresistive stack 31 and each of shield regions 32A and 32B.

Figure 4:
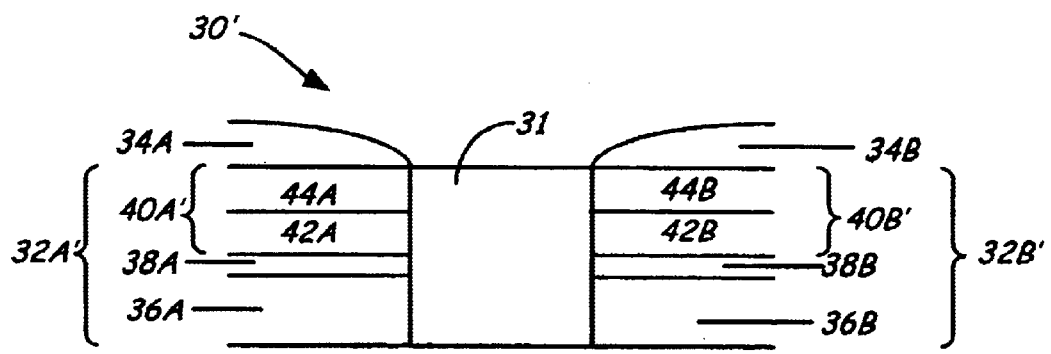
FIG. 4 is a layer diagram of a fifth embodiment of a read sensor of the present invention.

FIG. 4 is a layer diagram of a fifth embodiment of a read sensor 30' of the present invention. Read sensor 30' is similar to read sensor 30 of FIG. 3. Shield regions 32A' and 32B', however, differ from shield regions 32A and 32B of FIG. 3 in that permanent magnet layer 40A' includes an antiferromagnetic layer 42A and a ferromagnetic layer 44A, and permanent magnet layer 40B' includes an antiferromagnetic layer 42B and a ferromagnetic layer 44B. Antiferromagnetic layer 42A is exchange coupled to ferromagnetic layer 44A to fix the magnetization of ferromagnetic layer 44A, and together function as a permanent magnet layer. Similarly, antiferromagnetic layer 42B is exchange coupled to ferromagnetic layer 44B to fix the magnetization of ferromagnetic layer 44B, and together function as a permanent magnet layer.

Figure 5:
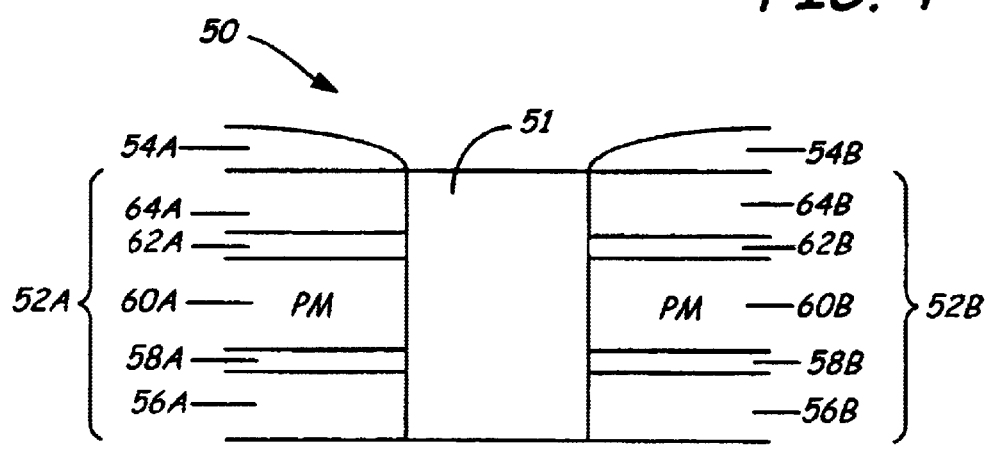
FIG. 5 is a layer diagram of a sixth embodiment of a read sensor of the present invention.

FIG. 5 is a layer diagram of a sixth embodiment of a read sensor 50 of the present invention Read sensor 50 includes a magnetoresistive stack 51, shield regions 52A and 52B, and contacts 54A and 54B. Magnetoresistive stack 51 is a giant magnetoresistive (GMR) stack configured to operate in a current-in-plane (CIP) mode wherein a sense current flows substantially parallel to the layers of the stack. Shield region 52A is positioned adjacent to a side surface of GMR stack 51, and includes a first ferromagnetic layer 56A, a first seed layer 58A, a permanent magnet layer 60A, a second seed layer 62A, and a second ferromagnetic layer 64A. First seed layer 58A is positioned between first ferromagnetic layer 56A and permanent magnet layer 60A, and second seed layer 62A is positioned between permanent magnet layer 60A and second ferromagnetic layer 64A. Shield region 52B is positioned adjacent to a side surface of GMR stack 51 opposite to shield region 52B, and includes a first ferromagnetic layer 56B, a first seed layer 58B, a permanent magnet layer 60B, a second seed layer 62B, and a second ferromagnetic layer 64B. First seed layer 58B is positioned between first ferromagnetic layer 56B and permanent magnet layer 60B, and second seed layer 62B is positioned between permanent magnet layer 60B and second ferromagnetic layer 64B. Contact 54A is positioned adjacent to second ferromagnetic layer 64A, and contact 54B is positioned adjacent to second ferromagnetic layer 64B.

Contacts 54A and 54B provide a sense current through GMR stack 51. The GMR signal produced by GMR stack 51 is generated by the sense current flowing parallel to the layers of GMR stack 51. Ferromagnetic layers 56A, 56B, 64A and 64B are preferably selected from the group consisting of NiFe, CoFe, CoZrNb, CoZrTi and NiFeX, where X is selected from the group consisting of Co, Cr, Rh, Re, Nb, Ta, Ti, V, Hf, W and Ru, and preferably have a thickness in the range of about 15 Å to about 60 Å. Seed layers 58A, 58B, 62A and 62B are preferably selected from the group consisting of Ti, Rh, Ta, Cu, Au and Ru, and preferably have a thickness in the range of about 30 Å to about 50 Å. Permanent magnet layers 60A and 60B are preferably selected from the group consisting of CoPt, CoCrPt and SmCo, and preferably have a thickness in the range of about 100 Å to about 300 Å. Ferromagnetic layers 56A, 56B, 64A and 64B shunt flux from an adjacent track to shield regions 52A and 52B instead of GMR stack 51. This reduces the side-reading effect of read sensor 50, and causes an effective decrease in reader width of read sensor 50. First seed layers 58A and 58B decouple the exchange between first ferromagnetic layers 56A and 56B and permanent magnet layers 60A and 60B, respectively. Second seed layers 62A and 62B decouple the exchange between permanent magnet layers 60A and 60B and second ferromagnetic layers 64A and 64B, respectively. Contacts 54A and 54B overlap second ferromagnetic layers 64A and 64B, respectively, and effectively eliminate a magnetoresistive effect from second ferromagnetic layers 64A and 64B.

In view of FIG. 1A, read sensor 50 would also function similarly if magnetoresistive stack 51 were either a GMR stack or a tunneling magnetoresistive (TMR) stack configured to operate in a current-perpendicular-to-plane (CPP) mode wherein a sense current flows substantially perpendicular to the layers of the stack. In both instances, contact 54A would be positioned adjacent to a top surface of magnetoresistive stack 51, and contact 54B would be positioned adjacent to a bottom surface of magnetoresistive stack 51 opposite to contact 54A. In addition, a layer of oxide insulation would be positioned between magnetoresistive stack 51 and each of shield regions 52A and 52B.

Figure 6:
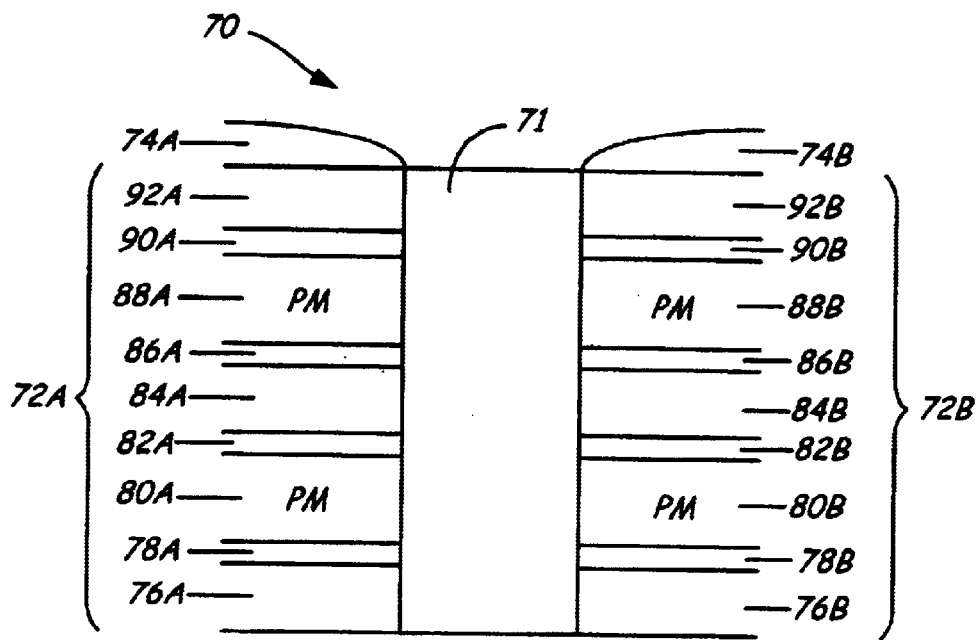
FIG. 6 is a layer diagram of a seventh embodiment of a read sensor of the present invention.

FIG. 6 is a layer diagram of a seventh embodiment of a read sensor 70 of the present invention. Read sensor 70 includes a magnetoresistive stack 71, shield regions 72A and 72B, and contacts 74A and 74B. Magnetoresistive stack 71 is a giant magnetoresistive (GMR) stack configured to operate in a current-in-plane (CIP) mode wherein a sense current flows substantially parallel to the layers of the stack. Shield region 72A is positioned adjacent to a side surface of GMR stack 71, and includes a first ferromagnetic layer 76A, a first seed layer 78A, a first permanent magnet layer 80A, a second seed layer 82A, a second ferromagnetic layer 84A, a third seed layer 86A, a second permanent magnet layer 88A, a fourth seed layer 90A, and a third ferromagnetic layer 92A. First seed layer 78A is positioned between first ferromagnetic layer 76A and first permanent magnet layer 80A, second seed layer 82A is positioned between first permanent magnet layer 80A and second ferromagnetic layer 84A, third seed layer 86A is positioned between second ferromagnetic layer 84A and second permanent magnet layer 88A, and fourth seed layer 90A is positioned between second permanent magnet layer 88A and third ferromagnetic layer 92A. Shield region 72B is positioned adjacent to a side surface of GMR stack 71 opposite to shield region 72A, and includes a first ferromagnetic layer 76B, a first seed layer 78B, a first permanent magnet layer 80B, a second seed layer 82B, a second ferromagnetic layer 84B, a third seed layer 86B, a second permanent magnet layer 88B, a fourth seed layer 90B, and a third ferromagnetic layer 92B. First seed layer 78B is positioned between first ferromagnetic layer 76B and first permanent magnet layer 80B, second seed layer 82B is positioned between first permanent magnet layer 80B and second ferromagnetic layer 84B, third seed layer 86B is positioned between second ferromagnetic layer 84B and second permanent magnet layer 88B, and fourth seed layer 90B is positioned between second permanent magnet layer 88B and third ferromagnetic layer 92B. Contact 74A is positioned adjacent to third ferromagnetic layer 92A, and contact 74B is positioned adjacent to third ferromagnetic layer 92B.

Contacts 74A and 74B provide a sense current through GMR stack 71. The GMR signal produced by GMR stack 71 is generated by the sense current flowing parallel to the layers of GMR stack 71. Ferromagnetic layers 76A, 76B, 84A, 84B, 92A and 92B are preferably selected from the group consisting of NiFe, CoFe, CoZrNb, CoZrTi and NiFeX, where X is selected from the group consisting of Co, Cr, Rh, Re, Nb, Ta, Ti, V, Hf, W and Ru, and preferably have a thickness in the range of about 15 Å to about 60 Å. Seed layers 78A, 78B, 82A, 82B, 86A, 86B, 90A and 90B are preferably selected from the group consisting of Ti, Rh, Ta, Cu, Au and Ru, and preferably have a thickness in the range of about 30 Å to about 50 Å. Permanent magnet layers 80A, 80B, 88A and 88B are preferably selected from the group consisting of CoPt, CoCrPt and SmCo, and preferably have a thickness in the range of about 100 Å to about 300 Å. Ferromagnetic layers 76A, 76B, 84A, 84B, 92A and 92B shunt flux from an adjacent track to shield regions 72A and 7213 instead of GMR stack 71. This reduces the side-reading effect of read sensor 70, and causes an effective decrease in reader width of read sensor 70. First seed layers 78A and 78B decouple the exchange between first ferromagnetic layers 76A and 76B and first permanent magnet layers 80A and 80B, respectively. Second seed layers 82A and 82B decouple the exchange between first permanent magnet layers 80A and 80B and second ferromagnetic layers 84A and 84B, respectively. Third seed layers 86A and 86B decouple the exchange between second ferromagnetic layers 84A and 84B and second permanent magnet layers 88A and 88B, respectively. Fourth seed layers 90A and 90B decouple the exchange between second permanent magnet layers 88A and 88B and third ferromagnetic layers 92A and 92B, respectively. Contacts 74A and 74B overlap third ferromagnetic layers 92A and 92B, respectively, and effectively eliminate a magnetoresistive effect from third ferromagnetic layers 92A and 92B.

In view of FIG. 1A, read sensor 70 would also function similarly if magnetoresistive stack 71 were either a GMR stack or a tunneling magnetoresistive (TMR) stack configured to operate in a current-perpendicular-to-plane (CPP) mode wherein a sense current flows substantially perpendicular to the layers of the stack. In both instances, contact 74A would be positioned adjacent to a top surface of magnetoresistive stack 71, and contact 74B would be positioned adjacent to a bottom surface of magnetoresistive stack 71 opposite to contact 74A. In addition, a layer of oxide insulation would be positioned between magnetoresistive stack 71 and each of shield regions 72A and 72B.

Figure 7:
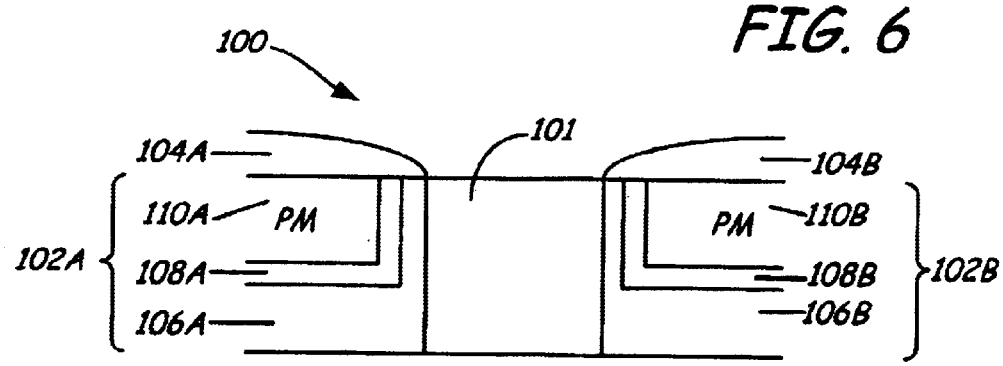
FIG. 7 is a layer diagram of an eighth embodiment of a read sensor of the present invention.

FIG. 7 is a layer diagram of an eighth embodiment of a read sensor 100 of the present invention. Read sensor 100 includes a magnetoresistive stack 101, shield regions 102A and 102B, and contacts 104A and 104B. Magnetoresistive stack 101 is a giant magnetoresistive (GMR) stack configured to operate in a current-in-plane (CIP) mode wherein a sense current flows substantially parallel to the layers of the stack. Shield region 102A is positioned adjacent to a side surface of GMR stack 101, and includes a ferromagnetic layer 106A, a seed layer 108A, and a permanent magnet layer 110A. Ferromagnetic layer 106A is positioned adjacent to GMR stack 101 and along a bottom surface of shield region 102A. Seed layer 108A is positioned between ferromagnetic layer 106A and permanent magnet layer 110A. Shield region 102B is positioned adjacent to a side surface of GMR stack 101 opposite to shield region 102A, and includes a ferromagnetic layer 106B, a seed layer 108B, and a permanent magnet layer 110B.

Ferromagnetic layer 106B is positioned adjacent to GMR stack 101 and along a bottom surface of shield region 102B. Seed layer 108B is positioned between ferromagnetic layer 106B and permanent magnet layer 110B. Contact 104A is positioned adjacent to permanent magnet layer 110A, and contact 104B is positioned adjacent to permanent magnet layer 110B.

Contacts 104A and 104B provide a sense current through GMR stack 101 The GMR signal produced by GMR stack 101 is generated by the sense current flowing parallel to the layers of GMR stack 101. Ferromagnetic layers 106A and 106B are preferably selected from the group consisting of NiFe, CoFe, CoZrNb, CoZrTi and NiFeX, where X is selected from the group consisting of Co, Cr, Rh, Re, Nb, Ta, Ti, V, Hf, W and Ru, and preferably have a thickness in the range of about 15 Å to about 60 Å. Seed layers 108A and 108B are preferably selected from the group consisting of Ti, Rh, Ta, Cu, Au and Ru, and preferably have a thickness in the range of about 30 Å to about 50 Å. Permanent magnet layers 110A and 110B are preferably selected from the group consisting of CoPt, CoCrPt and SmCo, and preferably have a thickness in the range of about 100 Å to about 300 Å. Ferromagnetic layers 106A and 106B shunt flux from an adjacent track to shield regions 102A and 102B, respectively, instead of GMR stack 101. This reduces the side-reading effect of read sensor 100, and causes an effective decrease in reader width of read sensor 100. Seed layers 108A and 108B decouple the exchange between ferromagnetic layers 106A and 106B and permanent magnet layers 110A and 110B, respectively.

Figure 8:
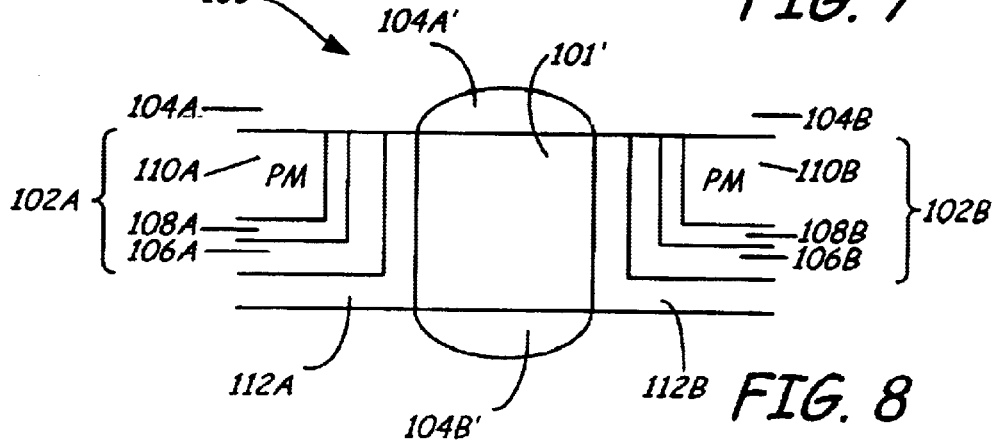
FIG. 8 is a layer diagram of a ninth embodiment of a read sensor of the present invention.

FIG. 8 is a layer diagram of a ninth embodiment of a read sensor 100' of the present invention. Read sensor 100' is similar to read sensor 100 of FIG. 7. Magnetoresistive stack 101', however, differs from magnetoresistive stack 101 of FIG. 7 in that magnetoresistive stack 101' is either a GMR stack or a tunneling magnetoresistive (TMR) stack configured to operate in a current-perpendicular-to-plane (CPP) mode wherein a sense current flows substantially perpendicular to the layers of the stack. Contact 104A' is positioned adjacent to a top surface of magnetoresistive stack 101', and contact 104B' is positioned adjacent to a bottom surface of magnetoresistive stack 101' opposite to contact 14A'. In addition, an oxide insulation layer 112A is positioned between magnetoresistive stack 101' and shield region 102A, as well as adjacent to a bottom surface of shield region 102A. Similarly, an oxide insulation layer 112D is positioned between magnetoresistive stack 101' and shield region 102B, as well as adjacent to a bottom surface of shield region 102B.

Although the present invention has been described with reference to preferred embodiments, workers skilled in the art will recognize that changes may be made in form and detail without departing from the spirit and scope of the invention.

What is claimed is:

1. A read sensor for use in a magnetic read head, the read sensor comprising:
    a magnetoresistive stack having a plurality of layers; and
    first and second shield regions positioned adjacent to the magnetoresistive stack, each of the shield regions including a first soft magnetic layer abutted to the magnetoresistive stack for shunting flux from an adjacent track to the shield region instead of the magnetoresistive stack.

2. The read sensor of claim 1 wherein each of the shield regions further includes:
    a first permanent magnet layer abutted to the magnetoresistive stack; and
    a first seed layer abutted to the magnetoresistive stack and positioned between the first soft magnetic layer and the first permanent magnet layer.

3. The read sensor of claim 2 wherein the first permanent magnet layer comprises:
    a ferromagnetic layer; and
    an antiferromagnetic layer.

4. The read sensor of claim 2 wherein each of the shield regions further includes:
    a second soft magnetic layer abutted to the magnetoresistive stack; and
    a second seed layer abutted to the magnetoresistive stack and positioned between the first permanent magnet layer and the second soft magnetic layer.

5. The read sensor of claim 4 wherein each of the shield regions further includes:
    a second permanent magnet layer abutted to the magnetoresistive stack, and
    a third seed layer abutted to the magnetoresistive stack and positioned between the second soft magnetic layer and the second permanent magnet layer.

6. The read sensor of claim 1 wherein the first soft magnetic layer is selected from the group consisting of NiFe, CoFe, CoZrNb, CoZrTi and NiFeX, where X is selected from the group consisting of Co, Cr, Rh, Re, Nb, Ta, Ti, V, Hf, W and Ru.

7. The read sensor of claim 1 wherein the first soft magnetic layer has a thickness in a range of about 15 Å to about 60 Å.

8. The read sensor of claim 2 wherein the first permanent magnet layer is selected from the group consisting of CoPt, CoCrPt and SmCo.

9. The read sensor of claim 2 wherein the first permanent magnet layer has a thickness in a range of about 100 Å to about 300 Å.

10. The read sensor of claim 2 wherein the first seed layer is selected from the group consisting of Ti, Rh, Ta, Cu, Au and Ru.

11. The read sensor of claim 2 wherein the first seed layer has a thickness in a range of about 30 Å to about 50 Å.

12. The read sensor of claim 1 wherein the magnetoresistive stack is configured to operate in a current-in-plane (CIP) mode wherein a sense current flows substantially parallel to a longitudinal plane of the layers of the stack.

13. The read sensor of claim 1 wherein the magnetoresistive stack is configured to operate in a currentperpendicular-to-plane (CPP) mode wherein a sense current flows substantially perpendicular to a longitudinal plane of the layers of the stack.

14. A read sensor for use in a magnetic read head, the read sensor comprising:
  a magnetoresistive stack having a plurality of layers; and
  first and second shield regions positioned adjacent to the magnetoresistive stack, wherein each shield region comprises:
    a first soft magnetic layer abutted to the magnetoresistive stack;
    a first permanent magnet layer abutted to the magnetoresistive stack; and
    a first seed layer abutted to the magnetoresistive stack and positioned between the first soft magnetic layer and the first permanent magnet layer.

15. The read sensor of claim 14 wherein the first permanent magnet layer comprises:
  a ferromagnetic layer; and
  an antiferromagnetic layer.

16. The read sensor of claim 14 wherein each shield region further comprises:
  a second soft magnetic layer abutted to the magnetoresistive stack; and
  a second seed layer abutted to the magnetoresistive stack and positioned between the first permanent magnet layer and the second soft magnetic layer.

17. The read sensor of claim 16 wherein each shield region further comprises:
  a second permanent magnet layer abutted to the magnetoresistive stack;
  a third seed layer abutted to the magnetoresistive stack and positioned between the second soft magnetic layer and the second permanent magnet layer.

18. The read sensor of claim 14 wherein the first soft magnetic layer is selected from the group consisting of NiFe, CoFe, CoZrNb, CoZrTi and NiFeX, where X is selected from the group consisting of Co, Cr, Rh, Re, Nb, Ta, Ti, V, Hf, W and Ru.

19. The read sensor of claim 14 wherein the first soft magnetic layer has a thickness in a range of about 15 Å to about 60 Å.

20. The read sensor of claim 14 wherein the first permanent magnet layer is selected from the group consisting of CoPt, CoCrPt and SmCo.

21. The read sensor of claim 14 wherein the first permanent magnet layer has a thickness in a range of about 100 Å to about 300 Å.

22. The read sensor of claim 14 wherein the first seed layer is selected from the group consisting of Ti, Rh, Ta, Cu, Au and Ru.

23. The read sensor of claim 14 wherein the first seed layer has a thickness in a range of about 30 Å to about 50 Å.

24. The read sensor of claim 14 wherein the magnetoresistive stack is configured to operate in a current-in-plane (CIP) mode wherein a sense current flows substantially parallel to a longitudinal plane of the pinned layer.

25. The read sensor of claim 14 wherein the magnetoresistive stack is configured to operate in a current-perpendicular-to-plane (CPP) mode wherein a sense current flows substantially perpendicular to a longitudinal plane of the pinned layer.

* * * * *

UNITED STATES PATENT AND TRADEMARK OFFICE
CERTIFICATE OF CORRECTION

PATENT NO. : 6,713,800 B2
APPLICATION NO. : 10/185260
DATED : March 20, 2004
INVENTOR(S) : Erli Chen et al.

It is certified that error appears in the above-identified patent and that said Letters Patent is hereby corrected as shown below:

Column 6,
Line 38, delete "7213" insert -- 72B --

Column 7,
Line 64, delete "112D" insert -- 112B --

Signed and Sealed this

Twelfth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 6,713,800 B2  Page 1 of 1
APPLICATION NO. : 10/185260
DATED : March 30, 2004
INVENTOR(S) : Erli Chen et al.

It is certified that error appears in the above-identified patent and that said Letters Patent is hereby corrected as shown below:

<u>Column 6,</u>
Line 38, delete "7213" insert -- 72B --

<u>Column 7,</u>
Line 64, delete "112D" insert -- 112B --

This certificate supersedes the Certificate of Correction issued February 12, 2008.

Signed and Sealed this

Fourth Day of March, 2008

JON W. DUDAS
*Director of the United States Patent and Trademark Office*